United States Patent
Saint

(10) Patent No.: US 6,837,271 B1
(45) Date of Patent: Jan. 4, 2005

(54) LIQUID FLOW CONTROL VALVE

(76) Inventor: William Henry Saint, Red Lyons Farm, Burnham Rd., Latchingdon, Essex CM3 6JH (GB)

(*) Notice: Subject to any disclaimer, the term of this patent is extended or adjusted under 35 U.S.C. 154(b) by 0 days.

(21) Appl. No.: 09/700,242

(22) PCT Filed: May 7, 1999

(86) PCT No.: PCT/GB99/01428
§ 371 (c)(1),
(2), (4) Date: Apr. 13, 2001

(87) PCT Pub. No.: WO99/58897
PCT Pub. Date: Nov. 18, 1999

(30) Foreign Application Priority Data

May 9, 1998  (GB) .............................................. 9809893

(51) Int. Cl.[7] .............................. F17D 5/06; G01M 3/28
(52) U.S. Cl. .................... 137/624.12; 137/80; 137/460; 137/553; 251/129.04
(58) Field of Search ................................ 137/457, 459, 137/460, 468, 498, 497, 499, 59, 553, 554, 557, 456, 79, 80, 487.5, 624.12, 624.11; 251/129.04

(56) References Cited

U.S. PATENT DOCUMENTS

| 4,838,310 A | * | 6/1989 | Scott et al. ......... 251/129.04 X |
| 5,086,806 A | * | 2/1992 | Engler et al. ....... 137/624.12 X |
| 5,139,044 A | * | 8/1992 | Otten et al. .................... 137/62 |
| 5,240,028 A | * | 8/1993 | Hoch, Jr. et al. ............. 137/80 |
| 5,287,876 A | * | 2/1994 | Takahashi ................. 137/80 X |
| 5,782,263 A | * | 7/1998 | Isaacson, Jr. et al. .... 137/487.5 |
| 5,971,011 A | * | 10/1999 | Price .................. 137/624.12 X |

* cited by examiner

Primary Examiner—Kevin Lee
(74) Attorney, Agent, or Firm—Renner, Kenner, Greive, Bodak, Taylor & Weber

(57) ABSTRACT

A liquid flow control valve has a valve body 10 in which is mounted a valve member 41 moveable between valve open and closed positions. A turbine 15 senses liquid flow through the valve body 10 and generates electrical pulses which are counted by a control circuit, over a pre-set period. An electro-magnet 54,55 controls operation of the valve member 41 and is driven by the control circuit so as to close the valve in the event that flow continues for longer than the pre-set period or the flow is greater than at a pre-set rate. The valve may also be closed should the temperature fall to about 0° C.

14 Claims, 4 Drawing Sheets

LIQUID FLOW CONTROL VALVE

BACKGROUND OF THE INVENTION

This invention relates to a liquid flow control valve. The invention further relates to a method of controlling flow along a pipe, such as the flow of water to a domestic dwelling or a commercial establishment.

In the following, both the background to the present invention and preferred embodiments of this invention will be described expressly with reference to the supply of water to a domestic dwelling or commercial establishment, though it will be appreciated that the liquid flow control valve of this invention may be applicable to other circumstances where there is a need to control the flow of liquid along a pipe.

In the case of a domestic dwelling, water flows into the dwelling from a supply main only relatively infrequently. Moreover, the volume drawn from the supply main is, on any one occasion when there is water flow, relatively small. However, should there be an abnormal condition, such as a tap left on inadvertently or some failure such as a burst pipe or a leak, then water will flow along the pipe to the dwelling for a prolonged period of time. In addition, in the case of a significant leak, the total volume delivered over an extended period will be relatively high.

SUMMARY OF THE INVENTION

It is a principal aim of the present invention to provide a control valve which permits the detection of such abnormal conditions and then takes remedial action in order to minimise water wastage. Moreover, it is a further aim to provide a method of performing these functions, again to minimise wastage.

According to one aspect of the present invention, there is provided a liquid flow-control valve comprising a valve body defining a flow path therethrough and including a valve seat, a valve member movable between an open position and a closed position engaged with the seat, and control means for controlling movement of the valve member from its open position to its closed position which control means monitors at least one of the flow rate through the valve and the duration of flow, and causes the valve member to move to its closed position when the monitored value exceeds a preset threshold value.

It will be appreciated that the control valve of this invention forms a kind of "fuse" but expressly adapted for a liquid flow pipe, in order that when an abnormal flow condition is detected, flow along the pipe will be shut off. Such an abnormal condition may be an excessive flow-rate, leading to a high flow volume over a protracted period, or it may be a lesser flow rate but for an unusually long period. Of course, the fluid flow control valve could be arranged to detect both of these abnormalities and should either or both occur, then to take the appropriate remedial action, of moving the valve member to its closed position so as to prevent further flow.

In one preferred form of the invention, an impeller is mounted in the flow path in the valve body, which impeller rotates as flow passes through the valve body. Rotation of the impeller may be monitored in order to determine both when flow is occurring and the rate of that flow. For example, rotation of the impeller may cause electrical pulses to be supplied to a control circuit, the rate of those pulses being dependent upon the rotation of the impeller. In one preferred embodiment, a magnet is secured to the impeller which magnet moves past a Hall-effect switch whereby that switch is able to condition an electrical signal each time the magnet moves past the switch. Another possibility would be to provide a reed switch the contacts of which are opened or closed as the magnet passes the switch. An alternative design may have a pair of electrodes spaced apart along the body of the valve, a control circuit providing a signal to those electrodes and monitoring the modification of that signal which will occur dependent upon the flow rate through the valve body, along the flow path.

The control means may comprise an electronic control circuit including a timer the output of which is used in conjunction with the flow signal, whereby the valve member may be operated dependent either one of the flow and timer signals. In this way, optimum control may be achieved with the valve being closed when the flow rate through the valve is too high or when the flow through the valve has been continuing for too long. The control circuit may permit a function of these two variables to be taken into account, in deciding whether the valve is to be closed. Thus, the circuit may serve to accumulate the total volume flow over a predetermined time period and if that exceeds a pre-set maximum, then the valve is closed.

The control circuit preferably includes manually pre-settable controls permitting adjustment both of the maximum flow rate and of the maximum continuous duration of flow, prior to causing the valve member to move to its closed position. An audible or visible alarm may also be incorporated in the control circuit, such that a warning may be given of when the valve has been triggered, to close.

In a modified form of the valve, there is provided a temperature sensor adapted to monitor the temperature of water passing through the valve. If the temperature of that water falls below some pre-set value, such as 2° C., a warning alarm may be given. If the temperature falls yet lower, the valve may be closed to prevent possible leakage of water through a burst pipe.

This modified form of the valve may be yet further modified, to monitor the temperature at some other point where there may be freezing conditions. For example, a sensor may be provided in the roof space of a domestic dwelling and the output of that sensor used to control operation of the valve either by itself or in combination with some other parameters such as the flow rate and flow duration. Thus, if it is detected that the temperature in the roof space falls below freezing, then much lower levels of flow rate and flow duration may be appropriate than when the detected temperature is above freezing.

The output of the sensor in the roof space may be communicated to the control circuit using conventional wiring. In the alternative other techniques may be employed, such as the use of control signals carried on the mains wiring, or by using a radio frequency transmitter, transmitting a signal to a receiver associated with the control circuit.

According to a second aspect of the present invention, there is provided a method of controlling the supply of water along a supply pipe to a water consumer from a supply main and in which supply pipe there is fitted a liquid flow control valve comprising a valve body defining a flow path therethrough and including a valve seat, a valve member movable between an open position and a closed position engaged with the seat, and control means for controlling movement of the valve member from its open position to its closed position, in which method at least one of the flow rate through the valve and the duration of water flow is monitored by the control arrangement, and the control arrangement causes the valve member to move to its closed position when the monitored value exceeds a preset threshold value.

BRIEF DESCRIPTION OF THE DRAWINGS

By way of example only, two specific embodiments of control valve of this invention, specifically intended for installation in a water supply pipe to a consumer, will now be described in detail, reference being made to the accompanying drawings in which:—

DETAILED DESCRIPTION OF THE PREFERRED EMBODIMENT

Figure 1:
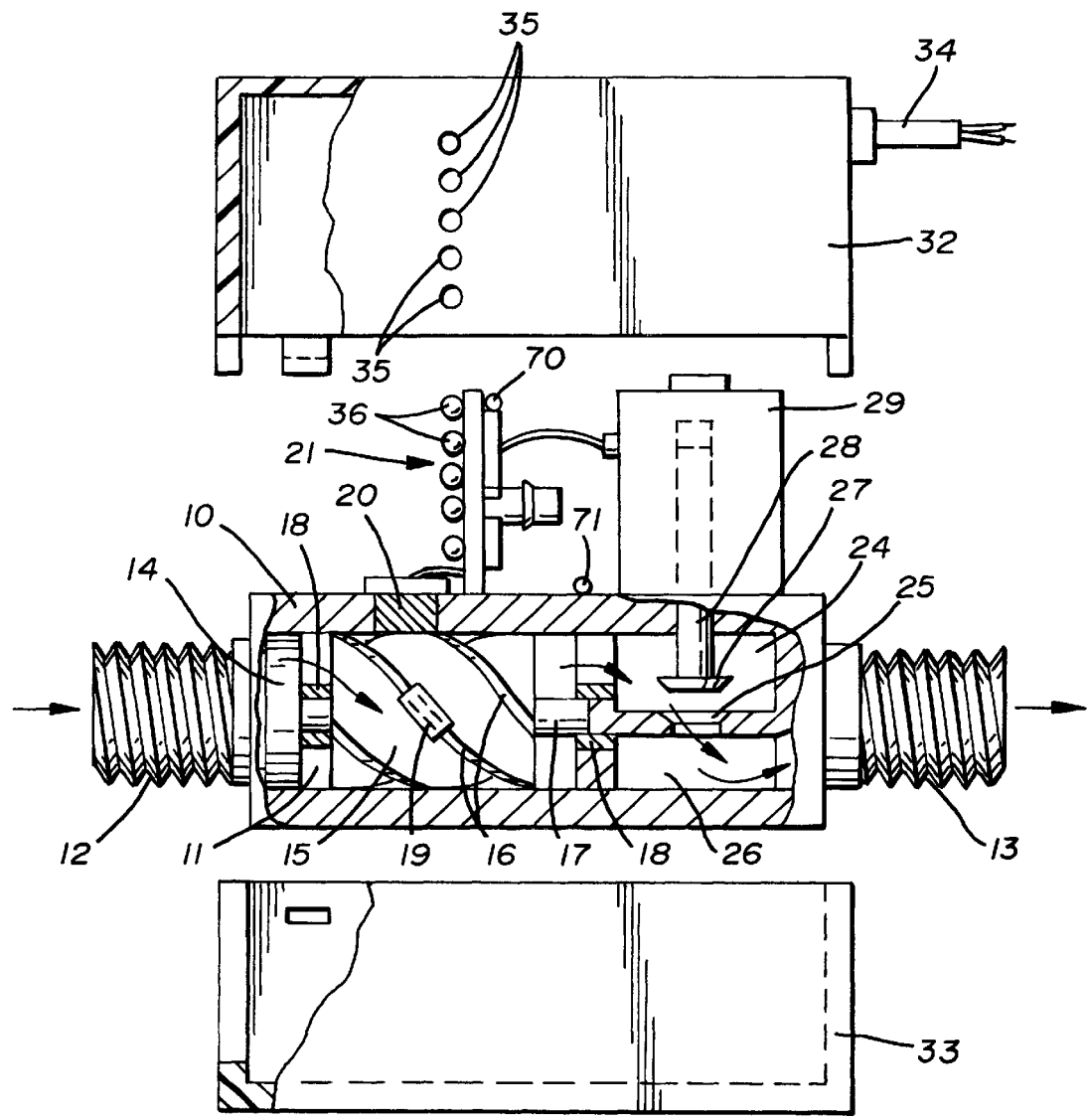
FIG. 1 is a cross-sectional view through a first embodiment of a flow control valve arranged in accordance with the present invention.

Referring initially to FIG. 1, the fluid flow control valve comprises a valve body 10 defining a fluid flow passageway 11 therethrough. At the two ends of the passageway 11, there are provided inlet and outlet threaded connectors 12 and 13, permitting the valve body to be fitted into a water supply pipe, from a supply main to a consumer, such as a domestic dwelling.

Within the valve body adjacent the inlet connector 12 is a filter unit 14 including a magnet, to assist the removal of particles from the water flow. In a case there the valve is fitted to a copper or plastic pipe, a ring magnet may instead be slipped over that pipe, immediately adjacent the valve. Down stream of the filter unit is an axial flow turbine 15 having an impeller provided with blades 16 arranged helically therearound, so that the impeller will turn as water flows through the body 10. The impeller shaft 17 is supported in low friction, non-corrosion bushings, to ensure that the impeller may freely rotate over a long service period. For example, the bushings may be of a ceramic material, with the impeller shaft 17 of a plastics material or possibly of stainless steel.

Secured to the periphery of the impeller is a magnet 19. A Hall effect switch 20 is mounted in an aperture in the body, for example by means of an epoxy adhesive to ensure water tightness, the magnet 19 passing that switch 20 on each turn of the impeller. The switch 20 is connected to an electronic control circuit 21 mounted externally of the body 10, to provide an impulse thereto on each full turn of the impeller.

A valve assembly is provided within the body 10, downstream of the turbine 15. Flow proceeds from the impeller into an inlet chamber 24, through a valve seat 25 and into an outlet chamber 26, provided that the valve is open; from the outlet chamber, the flow proceeds to the outlet threaded connector 13. A valve member 27 engageable with the valve seat 25 is connected to a valve rod 28 slidably mounted in the side of the body 10, suitable seals (not shown) being provided to ensure there is no leakage of water through the side of the body. The valve rod 28 forms the armature of a solenoid 29 current to which is supplied by the control circuit 21. A spring (not shown) urges the valve rod so that the member 27 engages the seat 25, the member being held away from the seat wherever the solenoid is energised.

A two-part plastic casing 32,33 is provided for the valve body together with the control circuit and solenoid, power for the operation of the device being supplied along cable 34. An external power supply unit (not shown) feeds low voltage electrical power along this cable so that mains voltage electricity is kept remote from the control valve itself. The plastic casing has windows 35 for LEDs 36 provided on the control circuit 21, in order that operation of the device may be monitored externally.

In use, the impeller of the turbine 15 will rotate whenever there is fluid flow through the valve, from the inlet connector 12 to the outlet connector 13. The rate of rotation will depend upon the flow rate through the valve and thus the number of pulses per unit time supplied to the control circuit will also depend upon the flow rate. The control circuit monitors both for the existence of pulses and the rate of delivery of those pulses and then controls operation of the valve dependant thereon.

Should there be an abnormally high pulse rate, or should pulses be delivered continuously for more than some predetermined period of time then the control circuit may cause the valve to close so as thereafter to inhibit all flow through the valve. Once the valve has been closed, by removing the drive current from the solenoid, the valve will remain closed until reset manually. For this purpose, there is an external re-set push button (not shown) which when depressed causes the valve to be opened and resets the control circuit.

So as to minimise the power consumption of the control circuit, it may be arranged to deliver a relatively large current pulse to the solenoid in order to open the valve and then to reduce the current down to the minimum required to maintain the valve in its open condition. Subsequently, on the control circuit removing the drive current altogether, the spring will serve to close the valve.

The control circuit may further include a temperature sensor 70 for air in the immediate vicinity of the valve. In the event that the air temperature falls below a predetermined minimum—and typically +½° C., the valve is closed so as to prevent water flow therethrough. The control circuit may also include presetable controls so as to permit proper setting up of the valve, for any given installation. Thus, the maximum flow period and the maximum volume flow may be preset taking into account the particular dwelling within which the valve is to be installed and the likely consumption of water.

The LEDs 36 show the current status of the valve. One LED may show that power is being supplied to the valve and another that the valve is open and working normally. A further LED may light when there is flow through the valve and two further LEDs may be used to show when the valve has closed either because of an excessive volume flow or because of flow occurring for longer than the preset maximum period.

The control circuit 21 includes a rechargeable battery which is trickle-charged from the mains operated power supply unit, so that operation may continue for a limited period even in the event of an interruption in the mains supply. The control circuit further includes a timer arranged to time certain pre-defined periods and also a counter for pulses from the Hall effect switch 20. The control circuit may further be coupled to a sensor for freezing conditions such as a temperature sensor 71 mounted on the body 10 of the valve.

Figure 2:
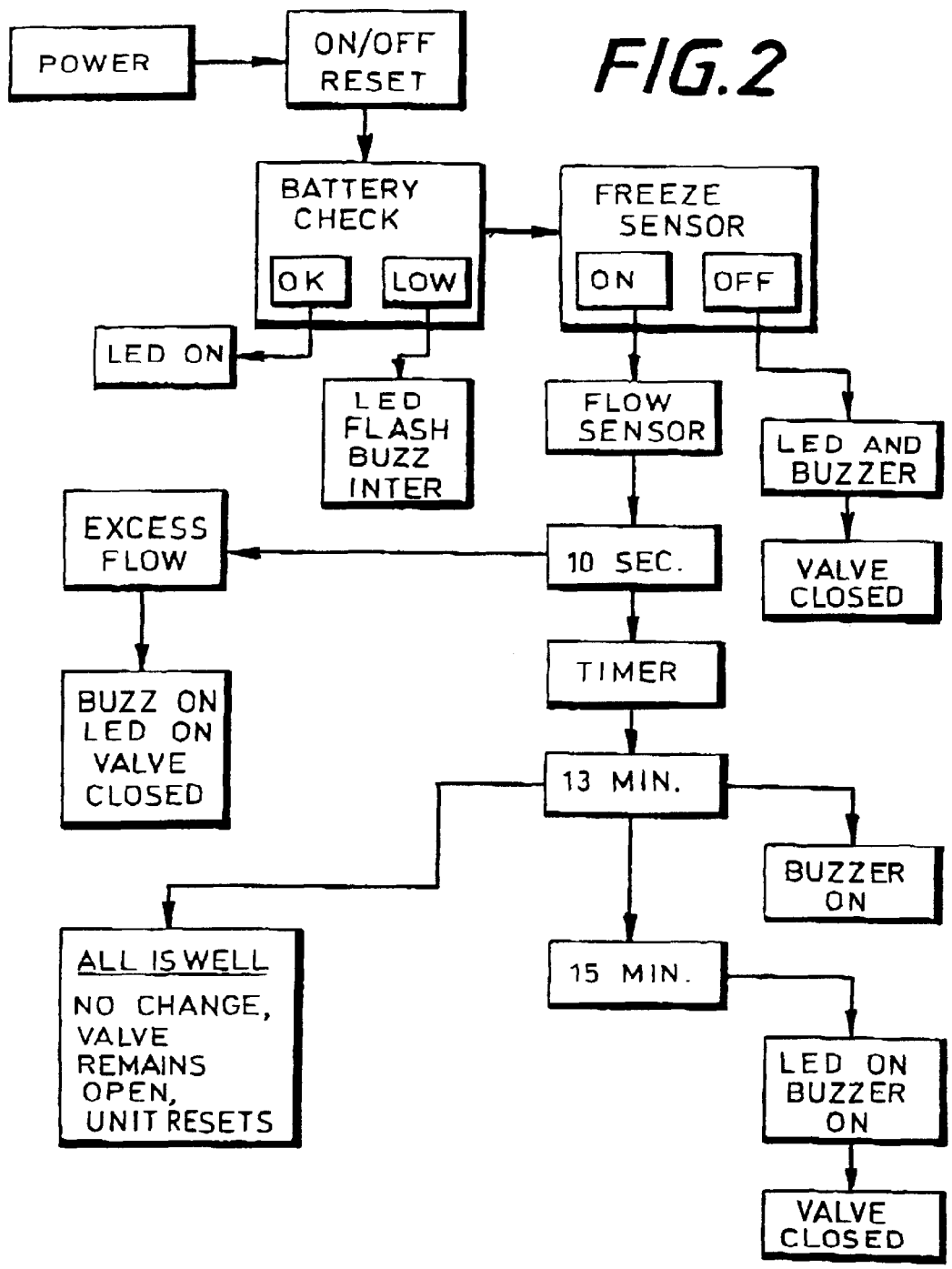
FIG. 2 is a flow chart for the control circuit of the valve of FIG. 1.

A flow chart for the operation of the control circuit is shown in FIG. 2; at power-on the control circuit performs a full reset followed by a battery check. A check may also be made for supply voltage at each reset; if a low voltage is detected, the circuit may switch to an internal rechargeable battery supply and also enter a low-current "sleep" mode to maximise running time from the battery source. Provided that all is well, and presuming that the temperature is above freezing, pulses from the flow switch 20 are used to determine the flow rate. If after 10 seconds an excessive flow rate is detected (i.e. a flow rate above a pre-set maximum value) the valve is closed, a suitable LED is lit and a warning given by means of a buzzer.

So long as the flow is lower than the pre-set maximum, a thirteen minute period is timed whilst the pulses are counted. If the flow has by then stopped and the maximum volume is less than the pre-set maximum, the control circuit decides all is well and the unit resets so that operation starts all over again. On the other hand if there is still flow, a buzzer is sounded to give a warning and timing continues for a further two minutes. If then there is still flow, the valve is closed and the warning is still given by means of the buzzer; another LED is lit to indicate the closed condition of the valve, awaiting a manual reset.

Figures 3, 3A:
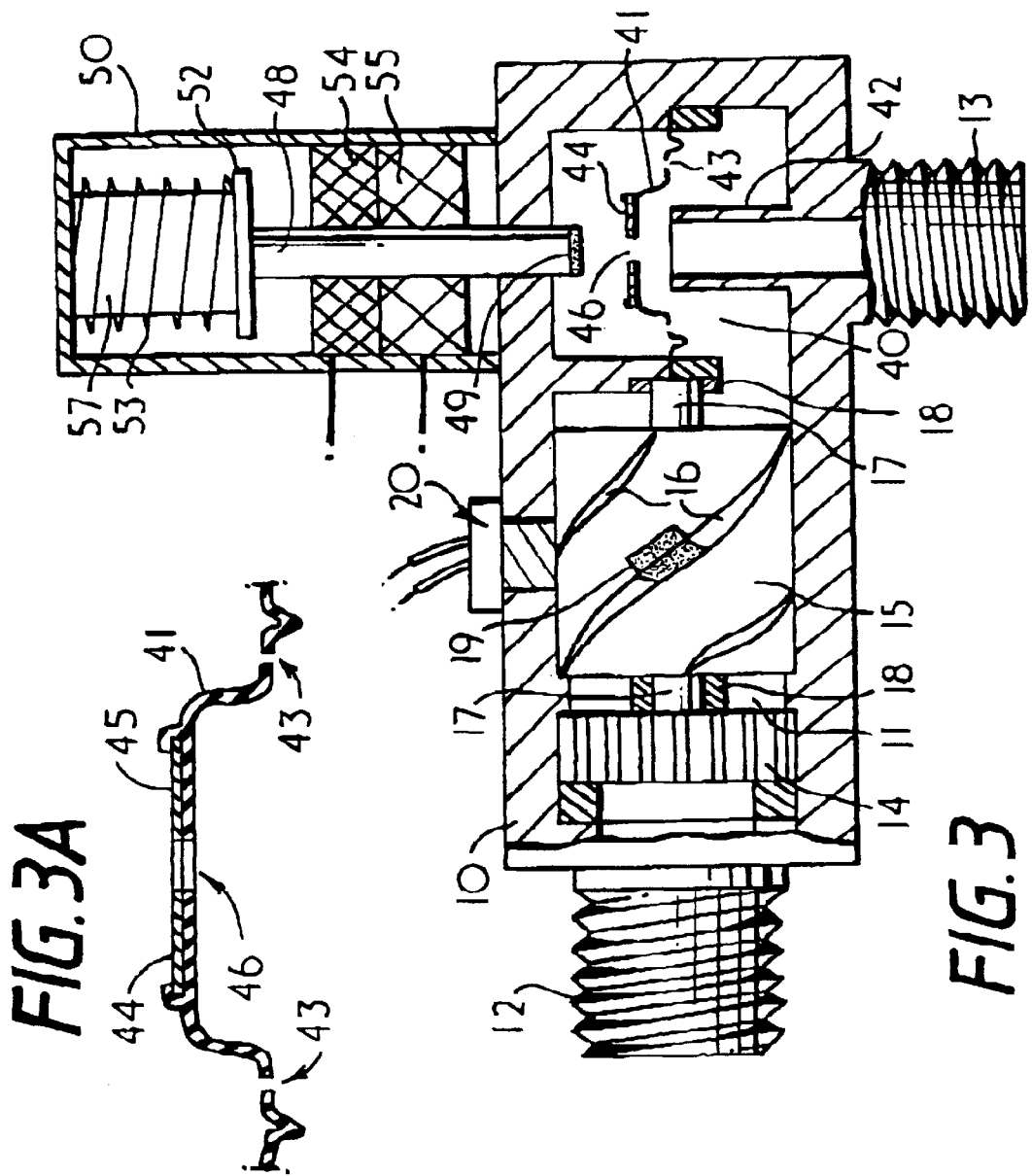
FIG. 3 is a cross-sectional view through a second embodiment in the form of control valve having an electronic control circuit.
FIG. 3a is a detail view on the diaphragm shown in FIG. 3.

Referring now to FIGS. 3 and 3a, there is shown a second embodiment of this invention for mounting in the supply pipe from a water main to a domestic dwelling. In FIG. 3, like parts with those of FIG. 1 are given like reference numbers and will not be described again here. This second embodiment uses an electronic control arrangement similar to that of FIG. 1 but this is not illustrated in FIG. 3. The principal difference as compared to FIG. 1 concerns the valve assembly, which will be described in detail below.

Downstream of the turbine 15 is a valve chamber 40 in which is mounted a circular diaphragm 41 to close off flow to an outlet duct 42 communicating with the outlet threaded connector 13, the end face of duct 42 serving as a seat for the diaphragm. The diaphragm has four bleed holes 43 arranged on a common pitch circle, to allow mains water pressure to enter an upper chamber 44, above the diaphragm 41. The central region of the diaphragm carries a washer 45 to impart substantial rigidity to that central region, the external diameter of the washer being greater than the valve seat defined by the outlet duct 42. A central orifice 46 communicates through the diaphragm and the central hole of the washer to the upper chamber 44.

A valve member 48 is slidably supported in line with outlet duct 42, seals (not shown) being provided around the valve member in the body 10 to prevent the leakage of water. The end of the valve member within the upper chamber 44 carries a resilient cup-seal 49 engageable with the washer 45 so as to close off the orifice 46. The valve member projects externally of the body 10 into a housing 50 provided with a permanent magnet 57 at its end remote from the body 10. The adjacent end of the valve member 48 has a magnetic plate 52 which is attracted to the magnet 57, a spring 53 acting between that plate and the end of the housing 50. The spring force is adjusted to that the magnet 57 will hold the plate 52 thereagainst once contact has been established but as soon as the plate 52 has been moved through a small distance away from the magnet, the force of the spring will push the valve member 48 towards the outlet duct 42 so that the seal 49 closes off orifice 46.

Two electromagnet coils 54, 55 are provided within the housing 50 around the valve member 48 and are would in opposite senses. Energisation of one coil pulls the valve member downwardly away from the magnet 57, whereas energisation of the other coil lifts the valve member up so that plate 52 engages the magnet 57 so as to be held thereby.

In this way, a latching arrangement is provided which is switched between its two positions by a pulse of current supplied to the appropriate coil, and when latched no further current need be supplied to either coil until the valve state is to be changed again. There is the further advantage that in the event of a power failure, the value state will be maintained until a power-on reset occurs on re-established of power to the circuit control.

In use, the normal position of the valve is as shown in FIG. 3, with the seal 49 clear of the orifice 46 and the diaphragm lifted away from the outlet duct 42. This occurs because the water pressure on both sides of the diaphragm is the same. The value is closed by the valve member being pulled away from magnet 57 to close orifice 46; this lightly presses the diaphragm 41 on to the outlet duct 42 whereafter the area of the diaphragm exposed to mains water pressure in the upper chamber 44 is significantly greater than the area exposed to that pressure below the diaphragm. In this way, the diaphragm is held in the closed position principally by the water pressure so long as the valve member continues to main closed orifice 46. The valve is opened by the valve member being lifted up to engage the magnet 57 so opening orifice 46. This allows the pressure above the diaphragm to fall so that the water pressure will lift the diaphragm as shown in FIG. 3 and flow may be established through the valve.

It will be appreciated that in the arrangement of FIG. 3 there is a much smaller power supply requirement since the only time the power must be supplied to one of the coils of the valve is when the valve is to change its state. In other respects, the control circuit of the arrangement of FIG. 3 operates in the same manner as that described with reference to FIG. 1, including the resetting of the valve and also the use of LEDs to illustrate the operating condition of the valve.

Figure 4:
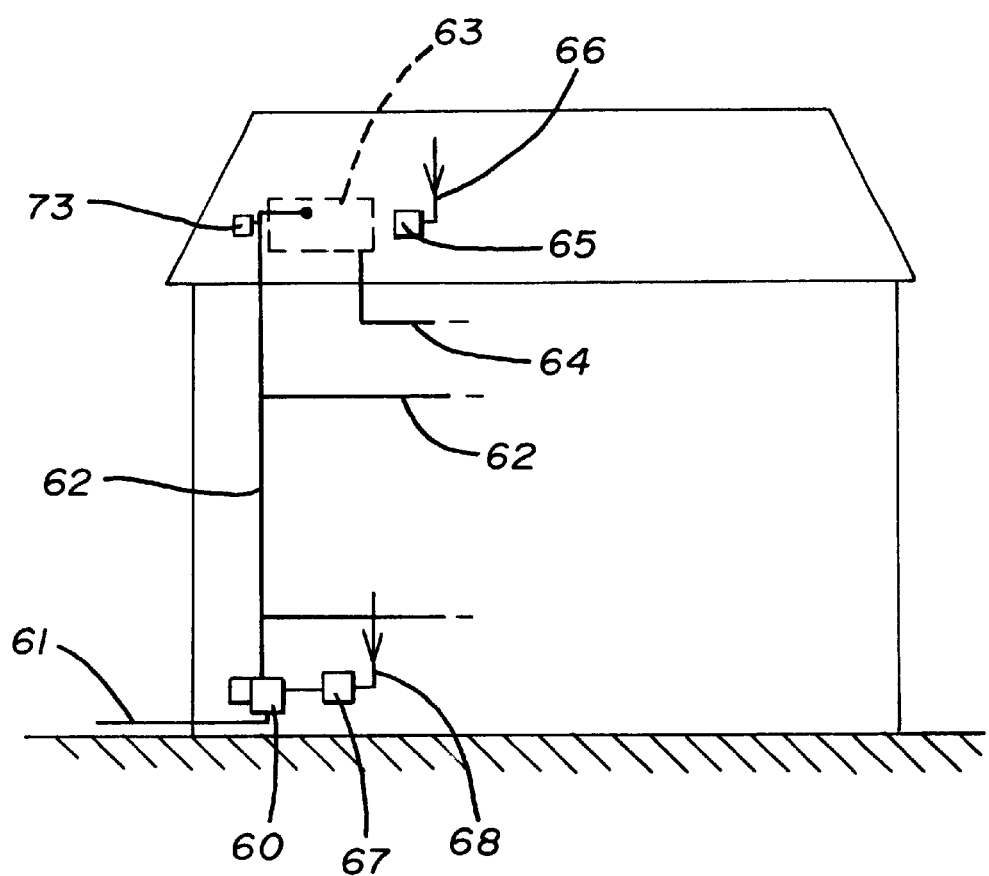
FIG. 4 diagrammatically illustrates the use of a sensor in the roof space of a dwelling.

FIG. 4 diagrammatically illustrates the installation of the valve of FIG. 3 in a domestic dwelling together with a modification of the overall arrangement. The control valve 60 is fitted to the incoming water main pipe 61 immediately downstream the normal manual stopcock (not shown) employed in a domestic dwelling. The outlet of the control valve is connected in the usual way to pipe work 62 in the dwelling, including a pipe leading to a cold water storage tank 63 installed in the roof space. A supply pipe 64 leads from the tank, in the conventional manner.

A temperature sensor 65 is privided in the roof space adjacent the incoming pipe, that sensor including a radio frequency transmitter having an aerial 66. That sensor and transmitter could be powered by a dry cell battery but preferably uses a mains-operated power supply delivering low voltage electricity thereto. The allow for operation during interruptions in the mains supply, the transmitter may be powered by rechargeable batteries which are trickle-charged by the mains supply. A water temperature sensor 73 may sense the temperature of the incoming water and also is connected back to the control circuit of the control valve 60.

Adjacent the control valve 60 is a receiver 67 for signals transmitted from the sensor 65 in the roof space. That receiver has an aerial 68 and may be operated by the same power supply as supplies electricity to the control valve itself. When the temperature in the roof space is detected as falling to 0° C. or thereabouts, the signal supplied to the receiver 67 may be modified to indicate this, so adjusting the way in which the control circuit operates. For example, this could cause the control circuit to close the valve if either the rate of flow or the duration of the flow exceed much lower pre-set limits than normally would be the case. In the alternative, the detected low temperature could simply cause an immediate closing of the valve.

A separate hand-held controller may be provided, for turning off and on the valve, which controller comprises a manually-operable transmitter similar to that in the roof space. In this way, water supplied to the dwelling may be turned off remotely when desired without the need to attend the physical stop-cock provided on the incoming main. The same functionality could be obtained by having the control circuit monitor the low voltage supply to the circuit. By turning off the supply and then on again with a pre-set period, the control circuit could cause the valve to change its state, from open to closed, or closed to open, as appropriate.

Though the valve has been described as being suitable for fitting in the supply pipe from a water main to a consumer's premises, it could be fitted elsewhere—for example in a pipe leading to water outlets from a storage tank, such as a cold-water tank in the roof space of a dwelling. The valve could also be fitted to the supply pipe of a domestic appliance such as a dishwasher or washing machine, with the control circuit set to monitor the total volume delivered over the time required for a complete wash cycle. If then there is an applicance malfunction, water damage may be limited, but if the appliance operates normally the control circuit may perform an auto-reset at the end of the cycle time, ready to motor volume flow on the next wash cycle.

What is claimed is:

1. A water flow control valve for use in a supply pipe for water to a domestic dwelling, comprising a valve body defining a flow path therethrough and including a valve seat, a valve member movable between an open position and a closed position engaged with the seat, an impeller mounted in the flow path and caused to rotate by water flow so as to carry a magnet mounted on the impeller past a switch device which responds to the magnetic force, respective pipe connectors at each end of the flow path to permit connection of the valve body into the water supply pipe, a temperature sensor, and control means for controlling movement of the valve member from its open position to its closed position which control means provides or modifies an electrical flow signal dependent upon the flow rate, the duration of flow through the valve and the output of the temperature sensor, the flow signal being connected to an electronic control circuit which operates the valve member dependent upon the sensed flow through the valve when the sensed water flow exceeds a pre-set maximum, when the flow continues for more than a pre-set period, or when the sensed temperature drops below a pre-set lower limit.

2. A water flow control valve as claimed in claim 1, wherein the temperature sensor is adapted to monitor the temperature of water passing through the flow path, or the air temperature around the valve.

3. A water flow control valve as claimed in claim 1, wherein the temperature sensor is adapted to monitor the temperature of the water or the air temperature at a remote location.

4. A water flow control valve as claimed in claim 3, wherein the control circuit includes a timer which produces a timer signal and the valve member is operated dependent upon both the flow and timer signals.

5. A water flow control valve as claimed in claim 3, wherein the control circuit includes a manually-operable control arranged to permit release of the valve member from its closed position.

6. A water flow control valve as claimed in claim 1, wherein a solenoid is arranged to hold the valve member away from its closed position.

7. A water flow control valve as claimed in claim 1, wherein there is a valve operating member which latches in both the open and closed positions and electromagnetic means are provided to move the valve member between its said open and closed positions.

8. A water flow control valve as claimed in claim 1, wherein the control circuit is associated with an audible or visible alarm whereby an indication of movement of the valve member to its closed position may be provided.

9. A water flow control valve as claimed in claim 1, where the valve member is spring-urged to its normally-closed position.

10. A water flow control valve as claimed in claim 5, wherein said manually-operable control comprises a remote control transmitter and a receiver for signals transmitted by said transmitter is operatively associated with the control valve whereby the valve member may be remotely moved between its said open and closed positions.

11. A water flow control valve for use in a supply pipe for water to a domestic dwelling, comprising a valve body defining a flow path therethrough and including a valve seat, a valve member movable between an open position and a closed position engaged with the seat, an impeller mounted in the flow path and caused to rotate by water flow so as to carry a magnet mounted on the impeller past a magnetic responsive device which responds to the magnetic force, respective pipe connectors at each end of the flow path to permit connection of the valve body into the water supply pipe, a first temperature sensor disposed to monitor the temperature of water passing through the valve, a remote temperature sensor adapted to monitor the temperature of air at a remote location with respect to the water flow control valve, and control means for controlling movement of the valve member from its open position to its closed position which control means provides or modifies an electrical flow signal dependent upon the flow rate, the duration of flow through the valve, the output of the first temperature sensor, and the output of the further temperature sensor, the electrical flow signal being connected to an electronic control circuit including a timer, which control circuit causes the valve member to move to its closed position under one of the conditions of (a) the sensed water flow exceeds a pre-set maximum, (b) the flow continues for more than a pre-set period, and (c) either sensed temperature drops below a pre-set lower limit.

12. A water flow control valve as claimed in claim 11, wherein a solenoid is coupled to the valve member to hold the valve member away from its closed position and drive current for the solenoid is provided by the electronic control circuit when the valve is to be held open.

13. A water flow control valve as claimed in claim 12, wherein there is provided a second remote temperature sensor adapted to monitor the temperature of the water supplied to the valve at a remote location with respect to the water flow control valve, which second remote temperature sensor is connected to the control circuit and the control circuit causes the valve member to move to its closed position when the sensed temperature at the remote location falls below a pre-set lower limit.

14. A water flow control valve for use in a supply pipe for water to a domestic dwelling, comprising a valve body defining a flow path therethrough and including a valve seat, a valve member movable between an open position and a closed position engaged with the seat, an impeller mounted in the flow path and caused to rotate by water flow so as to carry a magnet mounted on the impeller past a switch device which responds to the magnetic force, respective pipe connectors at each end of the flow path to permit connection of the valve body into the water supply pipe, a temperature sensor, and control means for controlling movement of the valve member from its open position to its closed position which control means provides or modifies an electrical flow signal dependent upon the output of the temperature sensor and a combined function of both the flow rate and the duration of flow through the valve, the flow signal being connected to an electronic control circuit which operates the valve member dependent upon the sensed flow through the valve when the sensed water flow exceeds a pre-set maximum, when the flow continues for more than a pre-set period, or when the sensed temperature drops below a pre-set lower limit.

* * * * *